United States Patent [19]
Brown et al.

[11] Patent Number: 5,484,348
[45] Date of Patent: Jan. 16, 1996

[54] DIFFERENTIAL UNIT

[75] Inventors: David Brown, Suffolk; John M. Lipman, Norfolk, both of United Kingdom

[73] Assignee: Lotus Cars Ltd., Norfolk, United Kingdom

[21] Appl. No.: 122,528

[22] PCT Filed: Aug. 14, 1992

[86] PCT No.: PCT/GB92/01505

§ 371 Date: Sep. 28, 1993

§ 102(e) Date: Sep. 28, 1993

[87] PCT Pub. No.: WO93/03939

PCT Pub. Date: Mar. 4, 1993

[30] Foreign Application Priority Data

Aug. 14, 1991 [GB] United Kingdom .................. 9117520

[51] Int. Cl.$^6$ ...................................................... F16H 1/28
[52] U.S. Cl. ........................................... 475/248; 475/903
[58] Field of Search ................................ 475/248, 250, 475/903

[56] References Cited

U.S. PATENT DOCUMENTS

| | | | |
|---|---|---|---|
| 846,754 | 3/1907 | McClintock | 475/248 |
| 1,859,245 | 5/1932 | Remington | 475/249 |
| 1,869,528 | 8/1932 | Trbojevich | 475/252 |
| 2,178,613 | 11/1939 | Seeck | 475/226 |
| 2,462,000 | 2/1949 | Randall | 475/227 |
| 3,008,355 | 11/1961 | Grudin | 475/903 |
| 3,540,311 | 11/1970 | Chillson | 475/903 |
| 4,389,908 | 6/1983 | Dudek | 475/90 |
| 4,444,298 | 4/1984 | Stangroom | 192/21.5 |
| 4,645,029 | 2/1987 | Sasaki et al. | 180/249 |
| 4,706,517 | 11/1987 | Garrett | 475/204 |
| 4,751,853 | 6/1988 | Dissett | 475/226 |
| 4,802,560 | 2/1989 | Bhadra et al. | 188/264 F |
| 4,821,603 | 4/1989 | Russell | 475/226 |
| 5,147,252 | 9/1992 | Mace et al. | 475/226 |

FOREIGN PATENT DOCUMENTS

| | | |
|---|---|---|
| 256240 | 10/1963 | Australia . |
| 44902 | 1/1974 | Australia . |
| 0032994 | 8/1981 | European Pat. Off. . |
| 0130806 | 1/1985 | European Pat. Off. . |
| 0347165 | 12/1989 | European Pat. Off. . |
| 0356401 | 2/1990 | European Pat. Off. . |
| 3600385 | 7/1986 | Germany . |
| 1099717 | 1/1968 | United Kingdom . |
| 2229502 | 9/1990 | United Kingdom . |
| WO87/00900 | 2/1987 | WIPO . |
| WO92/12361 | 7/1992 | WIPO . |

OTHER PUBLICATIONS

Abstract Of Australian Patent Specification No. 71285/74 Lodged Jul. 16, 1974.
Search Report of PCT/GB 92/01505.

*Primary Examiner*—Dirk Wright
*Attorney, Agent, or Firm*—Fulwider Patton Lee & Utecht

[57] ABSTRACT

The differential unit includes an input gear for receiving power, a first arrangement of gears for delivering power to a first output gear arrangement, and a second arrangement of gears for delivering power to second and third output gear arrangements. The first arrangement of gears transmits power from the input gear for receiving power to the first output gear arrangement and an input annular ring gear of the second arrangement of gears, and operates as a differential connected between the first output gear arrangement and the input annular ring gear of the second arrangement of gears. The second arrangement of gears transmits power from the input annular ring gear to both the second and third output gear arrangements and operates as a differential connected between the second and third output gear arrangements.

11 Claims, 3 Drawing Sheets

1
DIFFERENTIAL UNIT

The present invention relates to a differential unit.

The present invention will be discussed with reference to its use as a differential unit for an automobile. However, the invention should not be considered so limited, since the invention could be used as a differential unit for any application.

In recent years automobile manufacturers have been fitting smaller cars with four wheel drive requiring diffential gearing between wheels on the same axle and between the two pairs of wheels on different axles. It is a problem with smaller cars to provide differential units which are small enough to fit in the compact space available. Such differential units must be of low weight and the mass production must be reasonably cheap and require minimum parts.

The present invention provides a differential unit comprising; input means for receiving power; a first arrangement of gears for delivering power to first output means; and a second arrangement of gears for delivering power to second and third output means; wherein the first arrangement of gears transmits power from the input means for receiving power to both the first output means and a input means of the second arrangement of gears and operates as a differential connected between the first output means and the input means of the second arrangement of gears; and the second arrangement of gears transmits power from the second input means thereof to both the second and third output means and operates as a differential connected between the second and third output means.

The present invention thus provides a transmission system which can transmit power from an input to three different output shafts and provide for differential motion between the shafts.

In a first preferred embodiment of the invention the first arrangement of gears is an epicyclic arrangement comprising a first annulus gear which provides the input means for the differential, a first plurality of planet gears, a first planet gear carrier and first and second sun gears and the second arrangement of gears is an epicyclic arrangement which comprises a second annulus gear which provides the input means of the second arrangement of gears, a second plurality of planet gears, a second planet gear carrier and a third sun gear, wherein one gear serves as both the first sun gear of the first arrangement and the annulus gear of the second arrangement, the second sun gear providing the first output means, the second planet gear carrier providing the second output means and the third sun gear providing the third output means.

In the first preferred embodiment the first plurality of planet gears preferably comprises a plurality of gears of a first axial length and a plurality of gears of a second longer axial length, the plurality of gears of the second longer axial length engaging both the first sun gear and at least one of the plurality of gears of the first axial length and the plurality of gears of the first axial length engaging the second sun gear.

Preferably in the first embodiment the first sun gear has a larger pitch diameter than the second sun gear and the first and second suns are mounted for rotation about the same axis, the planet gears of the second longer length being mounted for rotation about axes parallel to and at a first radial distance from the common axis of rotation of the first and second sun gears and the plurality of planet gears of the first length being mounted for rotation about axes parallel to the said common axis of rotation at a second smaller radial distance.

In the first preferred embodiment the plurality of planet gears of second longer length preferably extend over at least a portion of both of the first and second sun gears whilst engaging with only the second sun gear and the plurality of planet gears of the first length extend over only the first sun gear and engage therewith.

The second sun gear of the first preferred embodiment is preferably provided with a cylindrical passage axially therethrough, which cylindrical passage enables an output shaft to extend through the second sun gear to connect with the third sun gear.

Preferably in the first preferred embodiment the means is provided on the second sun gear for connection of said gear to an output shaft, which means comprises a cylindrical cavity axial of the said gear having a splined inwardly facing surface.

In the first preferred embodiment preferably means is provided on the second planet carrier for connection of said planet carrier to an output shaft, which means preferably comprises a cylindrical cavity axial of the planet carrier having a splined inwardly facing surface.

Preferably in the first preferred embodiment means is provided on the third sun gear for connection of said gear to an output shaft, which means comprises a cylindrical passage axial of the said gear having a splined inwardly facing surface.

Preferably an output shaft is connected to the second sun gear and a sleeve is provided for engagement with the exterior of the output shaft, which sleeve provides connecting means for connecting the shaft to deliver power.

In use in the first preferred embodiment the sleeve is preferably slidable relative to the output shaft in a direction axial of the shaft and the sleeve comprises connection means for connecting the sleeve to the first planet gear carrier, actuating means operable by the user of the differential unit being provided to slide the sleeve relative to the output shaft between a first position in which the sleeve is connected with the first planet gear carrier by the connection means and a second position in which the sleeve is disconnected from the planet carrier, the output shaft being locked to the first planet gear carrier for rotation therewith in the first position of the sleeve and the output shaft rotating on rotation of the second sun gear in the second position of the sleeve.

Preferably there is provided means for disconnecting the output shaft from the differential unit.

The present invention also provides a differential unit for a multiple axle vehicle comprising input means for receiving power, first output means for delivering power to the wheels on a first axle, second and third output means for delivering power respectively to first and second wheels on opposed sides of a different axle, a first differential means which makes driving connection between the input means and both the first output means and an intermediate drive means whereby the first output means and the intermediate drive means are driven from the input means while allowing a differential speed difference between the first output means and the intermediate gear means and a second differential means which makes driving connection between the intermediate drive means and the second and third output means whereby the second and third output means are driven by the intermediate drive means while allowing a differential speed difference between the second and third output means.

A preferred embodiment of the present invention will now be shown with reference to the accompanying drawings in which.

Figure 1:
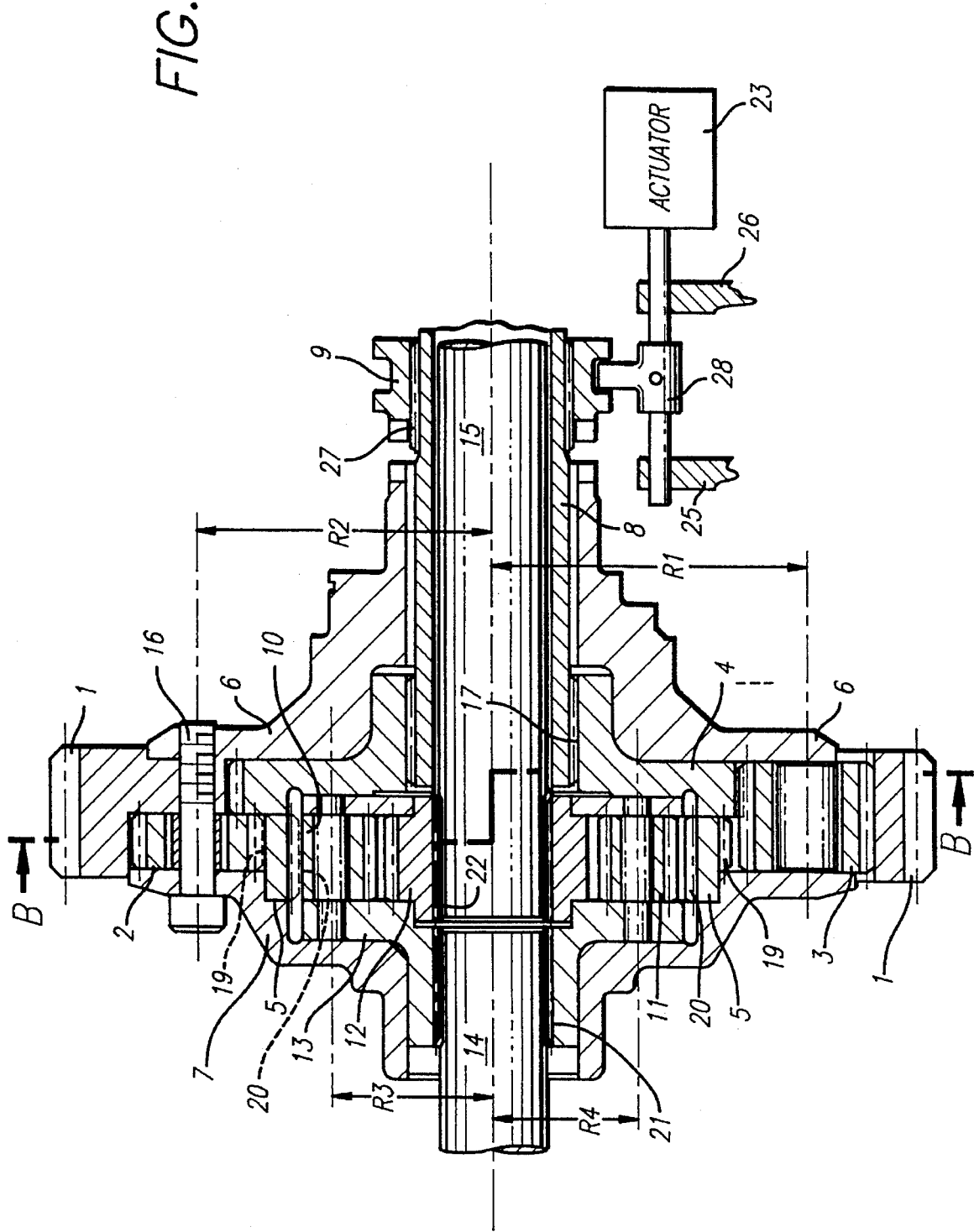
FIG. 1 shows a non-instantaneous axial cross-section through a transmission unit according to the invention.
Figure 2:
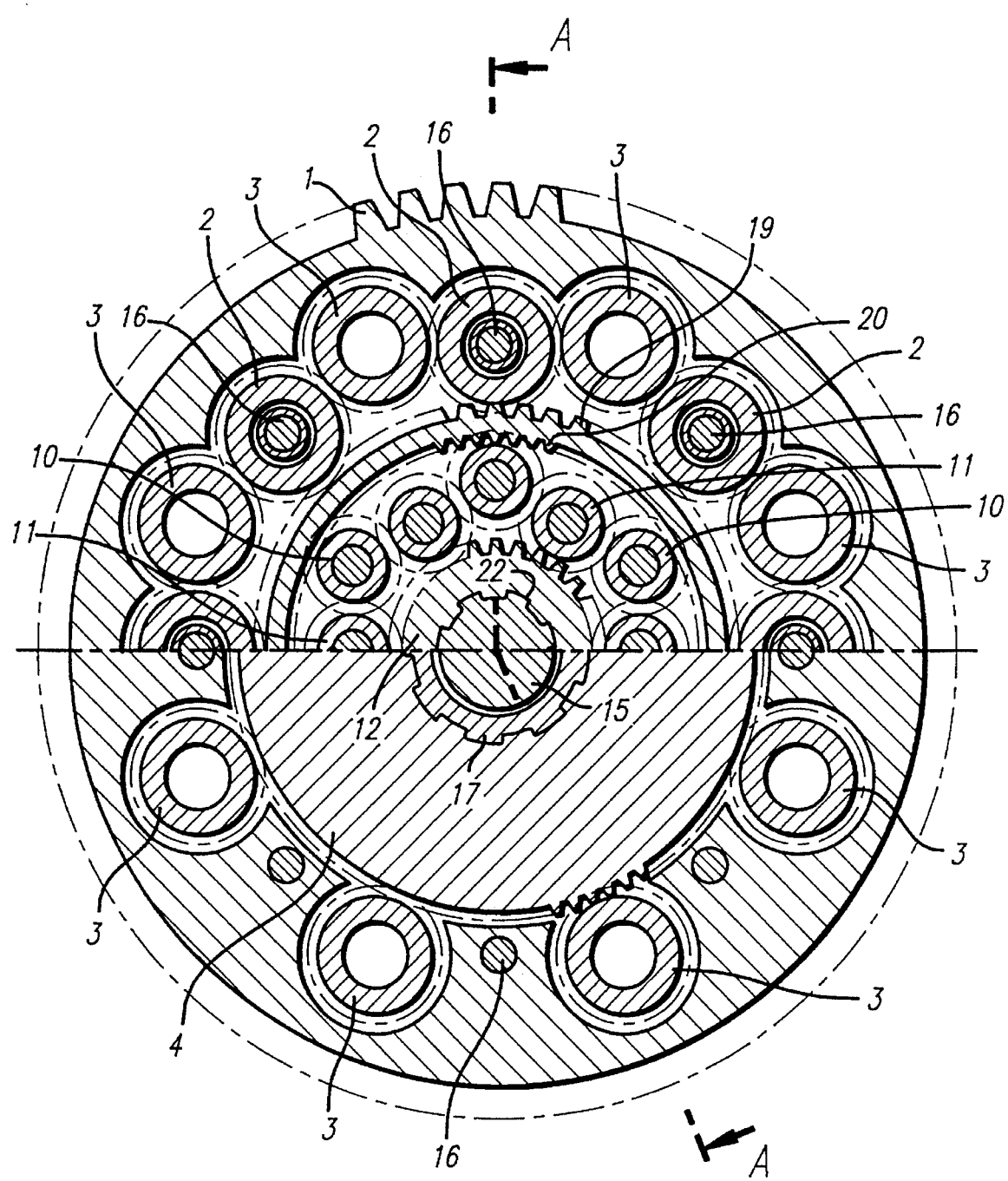
FIG. 2 shows a split transverse cross-section through the line BB of FIG. 1.
Figure 3:
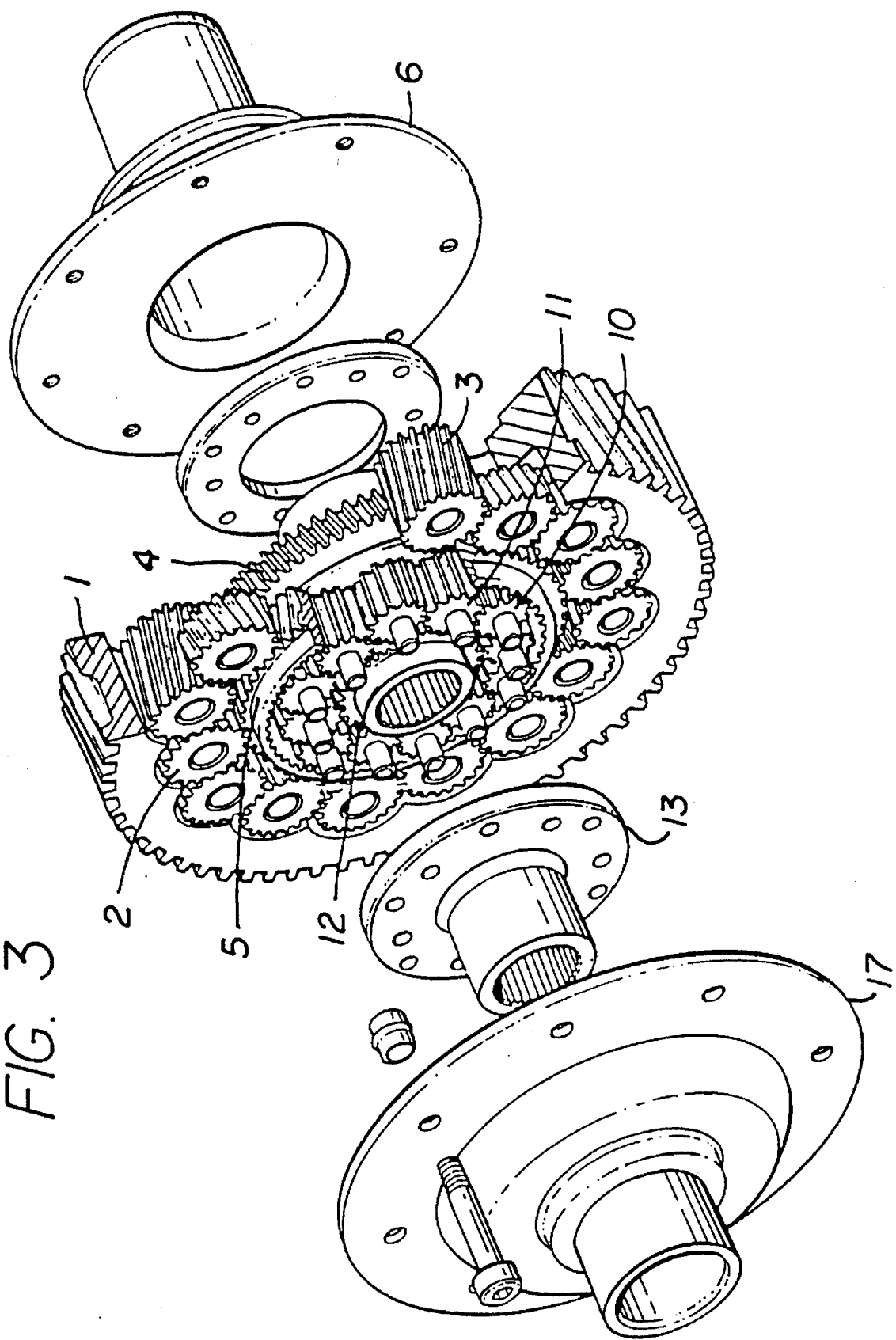
FIG. 3 shows an exploded isometric view of the transmission unit of the FIG. 1, partially cutaway.

In FIG. 1, the transmission unit of the preferred embodiment described herein is shown in a non-instantaneous cross-section along the line AA of FIG. 2. The embodiment comprises an input gear 1 which is an annular ring gear. The input gear 1 receives drive to the transmission unit. In use in an automobile, the input gear 1 is driven to rotate by the automobile engine. The input gear 1 is supported in bearings by the two housing members 6 and 7 which serve as covers for the gearing of the transmission unit and which rotate on rotation of the input gear. The input gear 1 can be attached to the housings 6 and 7 by means of a bolt such as 16.

Pockets are machined in the input gear 1 which are configured to receive two different types of planet gears, the short planet gears 2 and the longer planet gears 3. As seen in FIG. 2, each short planet gear 2 is received in a pocket adjacent to two longer planet gears 3 and all the planet gears intermesh; each short planet gear 2 meshing with two longer planet gears 3 and each longer planet gear 3 meshing with two short planet gears 2.

The long planet gears 3 each engage the large sun gear 4 and cause such to rotate. The large sun gear 4 is formed with teeth around its circumference and is also formed with a cylindrical cavity therethrough having splines 17 on its inward facing surface.

The drive is transmitted from the input gear 1 via the longer planet gears 3 to the sun gear 4 and then to an output shaft 8, which has a splined end which meshes with the splines 17 of the sun gear 4.

The longer gears 3 whilst each being of the same external diameter as the short gears 2 are mounted to rotate about axes which are further distanced from the axis of rotation of the output shaft 8 than the axes of rotation of the short planet gears 2. It can be clearly seen in FIGS. 1 and 2 that the axes of rotation of the longer gears 3 are at a first radial distance $R_1$ from the axis of rotation rotation of the differential unit, whilst the axes of rotation of the shorter gears 2 are at a second radial distance $R_2$ from the axis of rotation of the planet carrier. The radial distance $R_1$ is greater than the radial distance $R_2$. Therefore, whilst longer planet gears 3 mesh with the sun gear 4 they do not mesh with the sun gear 5.

The short planet gears 2 each mesh with the sun gear 5. The sun gear 5 is an annular ring gear. The sun gear 5 has external teeth 19 and internal teeth 20. The annular ring gear 5 is a sun gear in so far as it meshes with the planets 2 which are driven by the annulus 1. The annular ring gear 5 is also an annulus gear in that it meshes with planet gears 10 and 11 which rotate about a sun gear 12.

Drive transmitted to the annular ring gear 5 by the planets 2 is transmitted by the teeth internal of the annular gear 5 to the planets 10. The planets 10 and 11 are mounted for rotation in a planet carrier 13 about axes at a radial distance $R_3$ from the axis of rotation of the differential unit. Each planet 10 engages the two nearest planets 11. The planet gears 11 each engage the sun gear 12. The planet gears 11 are mounted on the planet carrier 13 for rotation about axes at a radial distance $R_4$ from the axis of rotation of the differential unit. The radial distance $R_3$ is greater than the radial distance $R_4$. None of the planets 10 and 11 engage both the ring gear 5 and the sun gear 12. Each planet 10 which engages the ring gear 5 has two neighbouring planets 11 which engage the sun gear 12 and vice-versa.

The planet carrier 13 has an annular cavity with splines 21 on the inward facing surface of the cavity. An output shaft 14 has a splined end which meshes with the splines 21 and therefore the output shaft 14 rotates with the same angular velocity as the carrier 13.

The planets 11 which mesh with the sun 12 rotate the sun. The sun 12 has an internal cylindrical cavity with splines 22 on the interior thereof. A shaft 15 which is co-axial with the output shaft 8 and rotates inside the hollow shaft 8 has a splined end which engages with the splines 22. Therefore the output shaft 15 has the same angular velocity as the sun gear 12.

In use in a front engined automobile the output shafts 14 and 15 would typically be used to provide a transverse transaxial drive to the front wheels of the automobile. The differential formed by the sun gear 12, the carrier 13, the planets 10 and 11 and the annular ring gear 5 allows the two front wheels to rotate at different speeds to one another. Simultaneously, the output shaft 8 would be connected to drive the rear wheels of the vehicle, drive being taken from the output shaft 8 via a bevel gearing. The transmission unit shown in the accompanying figures is configured to split the power from the engine unevenly between the front and rear wheels of the vehicle. The ratio of the number of teeth of the sun gear 4 to the number of teeth on the outside of the annular ring gear 5 determines the split of torque between the front and rear wheels.

In a preferred embodiment the transmission unit includes a sleeve 9 having internal splines which engage with splines 27 on the outside of the output shaft 8 to take drive from the output shaft. An actuator 23 is preferably provided to slide the sleeve 9 axially of the output shaft 8 to engage and disengage the housing 6 via a dog clutch. The actuator 23 is connected to a fork 28 which engages the sleeve 9. The fork 28 is connected to a rod 24 which is slidable relative to two mountings 25 and 26. The actuator 23 could be operated hydraulically, electrically, mechanically or pneumatically. By engaging the sleeve 9 with the housing 6 the differential formed be the input gear 1, the planets 2 and 3 and the sun 4 can be locked whilst the differential formed by the annular ring gear 5, the planets 20 the carrier 13 and the sun 12 is left in normal operation. The engagement of the sleeve 9 with the housing 6 can be selected by a driver by actuating the actuating means, thus obtaining very high traction from front and rear wheels in very adverse conditions. Also, if the propshaft to the rear axle is disconnected then the locking of the sleeve 9 to the housing 6 will allow checks to be carried out on the vehicle using standard two wheel drive test facilities, such as dynamometer tests and emission tests.

It should be noted that whilst in the embodiment described above the planet gears 2 and 3 engaged are in full engagement around the unit, pairs of gears which engage only with each other could be used instead. Furthermore, any number of planet gears 10 and 11 could be used up until the full complement extending around the sun 12, providing that there are at least two planet gears, both in engagement with each other and one engaging the sun 12 and the other the ring gear 5.

It should also be noted that whilst in the above embodiments the planet gears 3 and 2 have the same diameter and the same number of teeth, the applicant envisages that different diameters and numbers of teeth could be used for each and the use of planet gears 2 having a different diameter to planet gears 3 would be advantageous in certain applications to accomplish a desired split of torque between the output shafts. Furthermore, the planets 10 and 11 could also be chosen to be of different diameters to one another.

The invention could also be modified to provide four different output shafts by using the larger sun gear 4 as the annulus to an epicyclic arrangement of gears in which one output shaft would be connected to a sun and the other outward shaft connected to a planet carrier.

Whilst use of the differential in a front engined car has been described above, the differential could also be used for rear/mid engine applications, in which case the shafts 14 and 15 would be used to drive the two rear wheels of the vehicle and the shaft 8 used to supply power to the front wheels of a vehicle.

From the above description it will be appreciated that the present invention provides a differential unit with three outputs which may rotate at differential velocities to each other which has a very compact nature and could feasibly be packaged in the same space as currently occupied by the front drive differential of typical front wheel drive cars.

The present invention also provides a saving in materials and costs over systems of four wheel drive cars that have in the past used a first differential for splitting the drive between the front wheel of the vehicle and a second differential used for splitting the drive between the front wheels and the rear wheels of a vehicle. Obviously, the present invention performs both functions in one unit, thus using fewer parts with a lower weight and lower cost.

We claim:

1. A differential unit comprising;

input means for receiving power;

a first arrangement of gears for delivering power to first output means;

a second arrangement of gears for delivering power to second and third output means; wherein the first arrangement of gears transmits power from the input means for receiving power to both the first output means and an input means of the second arrangement of gears and operates as a differential connected between the first output means and the input means of the second arrangement of gears, the second arrangement of gears transmits power from the input means thereof to both the second and third output means and operates as a differential connected between the second and third output means;

the first arrangement of ears is an epicyclic arrangement comprising a first annulus gear which provides the input means for the differential, a first plurality of planet gears, a first planet gear carrier and first and second gears, the second arrangement of gears is an epicyclic arrangement comprising a second annulus gear which provides the input means for the second arrangement of gears, a second plurality of planet gears, a second planet gear carrier and a third sun gear, and one gear serves as both the first sun gear of the first arrangement and the annulus gear of the second arrangement, the second sun gear providing the first output means, the second planet gear carrier providing the second output means and the third sun gear providing the third output means.

2. A differential unit as claimed in claim 1 wherein the first plurality of planet gears comprises a plurality of gears of a first axial length and a plurality of gears of a second longer axial length, the plurality of gears of the second longer axial length engaging both the first sun gear and at least one of the plurality of gears of the first axial length and the plurality of gears of the first axial length engaging the second sun gear.

3. A differential unit as claimed in claim 2 wherein the first sun gear has a larger pitch diameter than the second sun gear and the first and second suns are mounted for rotation about the same axis, the planet gears of the second longer length being mounted for rotation about axes parallel to and at a first radial distance from the common axis of rotation of the first and second sun gears and the plurality of planet gears of the first length being mounted for rotation about axes parallel to the said common axis of rotation at a second smaller radial distance.

4. A differential unit as claimed in claim 3 wherein the plurality of planet gears of second longer length extend over at least a portion of both of the first and second sun gears whilst engaging with only the second sun gear and the plurality of planet gears of the first length extend over only the first sun gear and engage therewith.

5. A differential unit as claimed in claim 1 wherein the second sun gear is provided with a cylindrical passage axially therethrough, which cylindrical passage enables an output shaft to extend through the second sun gear to connect with the third sun gear.

6. A differential unit as claimed in claim 1 wherein the first output means provided by the second sun gear comprises means for connection of said gear to an output shaft comprising a cylindrical cavity axial of the said gear having a splined inwardly facing surface.

7. A differential unit as claimed in claim 1 wherein means is provided on the second planet carrier for connection of said planet carrier to an output shaft which means comprises a cylindrical cavity axial of the planet carrier having a splined inwardly facing surface.

8. A differential unit as claimed in claim 1 wherein means is provided on the third sun gear for connection of said gear to an output shaft which means comprises a cylindrical passage axial of the said gear having a splined inwardly facing surface.

9. A differential unit as claimed in claim 1 Wherein an output shaft is connected to the second sun gear and a sleeve is provided for engagement with the exterior of the output shaft, which sleeve provides connecting means for connecting the shaft to deliver power.

10. A differential unit as claimed in claim 9 wherein the sleeve is slidable relative to the output shaft in a direction axial of the shaft and the sleeve comprises connection means for connecting the sleeve to the first planet gear carrier and wherein actuating means operable by the user of the differential unit is provided to slide the sleeve relative to the output shaft between a first position in which the sleeve is connected with the first planet gear carrier by the connection means and a second position in which the sleeve is disconnected from the planet carrier, the output shaft being locked to the first planet gear carrier for rotation therewith in the first position of the sleeve and the output shaft rotating on rotation of the second sun gear in the second position of the sleeve.

11. A differential unit as claimed in claim 10 wherein there are provided means for disconnecting the output shaft from the differential unit.

* * * * *